United States Patent [19]

Shapiro et al.

[11] Patent Number: 4,715,818

[45] Date of Patent: Dec. 29, 1987

[54] COMPUTER TRAINING SYSTEM

[75] Inventors: Ronald L. Shapiro, 11219 Empire Ln., Rockville, Md. 20852; Raymond M. Thompson, Jr., Washington, D.C.

[73] Assignee: Ronald Lewis Shapiro, Rockville, Md.

[21] Appl. No.: 677,998

[22] Filed: Dec. 4, 1984

[51] Int. Cl.[4] .............................................. G09B 19/00
[52] U.S. Cl. .................................. 434/118; 434/307; 434/323; 434/350
[58] Field of Search ............... 434/118, 307, 323, 355, 434/350, 351

[56] References Cited

U.S. PATENT DOCUMENTS

| | | | |
|---|---|---|---|
| 3,500,336 | 3/1970 | Cuccio | 358/148 |
| 3,623,242 | 11/1971 | Hoover | 434/351 |
| 4,052,798 | 10/1977 | Tomita et al. | 434/307 |
| 4,310,317 | 1/1982 | Nomura et al. | 434/350 |
| 4,538,993 | 9/1985 | Krumholz | 434/118 |

Primary Examiner—Leo P. Picard
Attorney, Agent, or Firm—Fleit, Jacobson, Cohn & Price

[57] ABSTRACT

A computer training system (10) includes an instructor work station (12) and a plurality of student work stations (14). A display on a computer video monitor (22) at each of the student work stations (14) can be selectively displayed on a computer video monitor (18) at the instructor work station (12) without disturbing a student at the student work station. A display on the instructor computer video monitor (18) also can be selectively displayed on one or more of the student computer video monitors (22) for individual or group instruction.

13 Claims, 3 Drawing Figures

COMPUTER TRAINING SYSTEM

BACKGROUND OF THE INVENTION

1. Technical Field

This invention relates to a computer training system, and more particularly to a microcomputer training system in which a microcomputer video monitor at an instructor work station can be selectively connected to one or more microcomputer video monitors at a plurality of student work stations to facilitate individual or group instruction in the use of a microcomputer.

2. Background Art

The trend toward the universal use of personal-type computers in business and society in general has created an urgent need for improved technigues and procedures in the training of individuals in the use of such computers. In this connection, known classroom techniques, in which an instructor proceeds from one student to another to monitor their progress and to provide corrective instruction, has a number of disadvantages. For example, the presence of the instructor closely adjacent to a student as the student proceeds through traininq exercises can be disconcerting to the student and have an adverse effect upon the learning process. Further, in order for the instructor to correct the student's work when the student is encountering difficulty, it frequently is necessary for the instructor to disturb the student's work on the student's computer in order to demonstrate the proper procedure. Where the class involves a large number of students, such as six or more, it also is difficult for the instructor to provide group instruction to the entire class simultaneously.

Accordingly, a purpose of this invention is to provide a new and improved computer training system in which computers and associated video monitors at a plurality of student work stations can be selectively connected to a computer video monitor at an instructor work station such that a display on a connected one of the student video monitors can be displayed on the instructor video monitor.

Another purpose of this invention is to provide a new and improved computer training system in which a computer and an associated video monitor at an instructor work station can be selectively connected to one or more of a plurality of computer video monitors at respective student work stations such that a display on the instructor video monitor is displayed on the connected student video monitors.

SUMMARY OF THE INVENTION

Briefly, a computer training system comprises an instructor work station and at least one student work station each including a computer having an associated video monitor. A switching means may be provided for selectively connecting the student work station computer and video monitor to the instructor work station video monitor such that a display on the student work station video monitor is displayed on the instructor work station video monitor. A switching means also may be provided for selectively connecting the instructor work station computer and video monitor to the student work station video monitor such that a display of the instructor work station video monitor is displayed on the student work station video monitor.

More specifically, the computer training system comprises an instructor work station which includes a computer having an associated video monitor and a plurality of student work stations, each including a computer having an associated video monitor. Each of the video monitors at the student work stations is selectively connectable by a first switching means to a video monitor at the instructor work station such that a video display on the student video monitor is displayed on the instructor video monitor. At the same time, the first switching means disconnects the instructor work station video monitor from the instructor work station computer. Further, the computer and video monitor at the instructor work station are selectively connectable by a second switching means to each of the video monitors at the student work stations such that a display on the instructor work station video monitor is displayed on each connected student work station video monitor. At the same time, the second switching means disconnects each thus connected student video monitor from the associated student work station computer.

BRIEF DESCRIPTION OF THE DRAWINGS

FIG. 3 is a view of a control panel of the computer training system.

DETAILED DESCRIPTION

Figure 1:
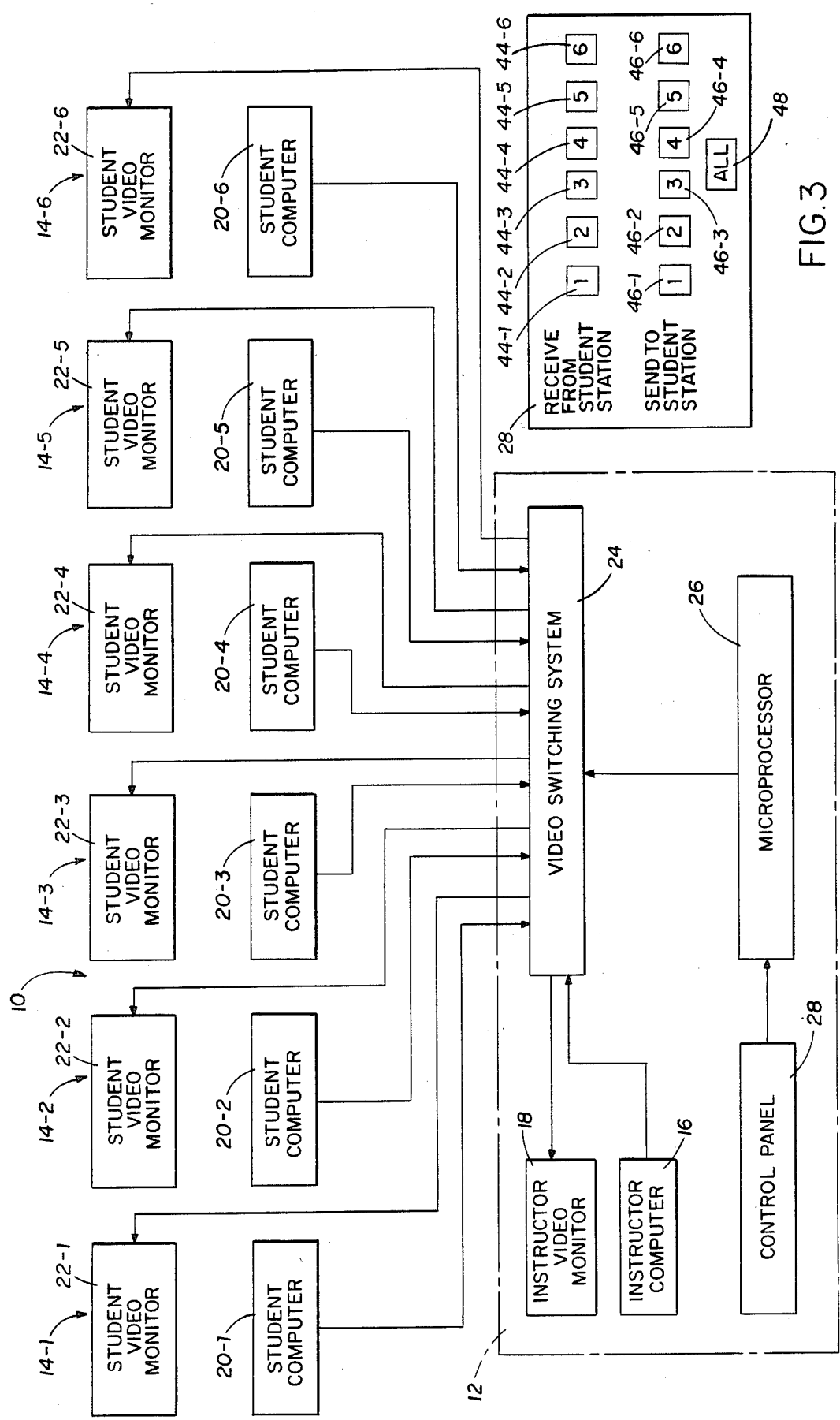
FIG. 1 is a block diagram of a computer training system in accordance with the invention.

Referring to FIG. 1, a computer training system 10 in accordance with the invention includes an instructor work station 12 and a plurality (e.g., six) of student work stations 14, designated by the numbers 14-1 through 14-6. The instructor work station 12 comprises a personal-type computer 16, such as a microcomputer, and an associated computer video monitor 18. Similarly, each of the student work stations 14 includes a personal type computer 20, designated by the numbers 20-1 through 20-6, and an associated video monitor 22, designated by the numbers 22-1 through 22-6.

With further reference to FIG. 1, the instructor work station 12 further includes a video switching system 24 for selectively connecting each of the student work station computers 20 and video monitors 22 to the instructor work station video monitor 18 and for selectively connecting the instructor work station computer 16 and the instructor work station video monitor 18 to the student work station video monitors. In the embodiment of the invention shown in the drawings, the video switching system 24 is controlled by a microprocessor 26 and a control panel 28 located at the instructor work station 12

More specifically, the configuration of the video switching system 24 is such that the instructor can selectively connect each of the student work station computers 20 and the associated computer video monitor 22 to the instructor work station computer video monitor 18 whereby a display on the student video monitor is displayed on the instructor video monitor. Thus, the instructor can observe the student's work without the instructor leaving the instructor work station 12 and without disturbing the student or the student's work. The instructor also can selectively connect the instructor work station computer 16 and the instructor video monitor 18 to each of the student video monitors 22 such that a display on the instructor's video monitor is displayed on the student's video monitor. Thus, the instructor can provide corrections and instructions to the student without the instructor leaving the instructor work station 12 and without disturbing the work which the student has already inputted into the student's computer 20. In addition, the instructor can connect the instructor's computer 16 and the instructor's video monitor 18 to all of the student video monitors 22 simultaneously for group instruction on their individual student video monitors, thus utilizing the instructor video monitor and the student video monitors as an integrated system of "electronic blackboards."

Figure 2:
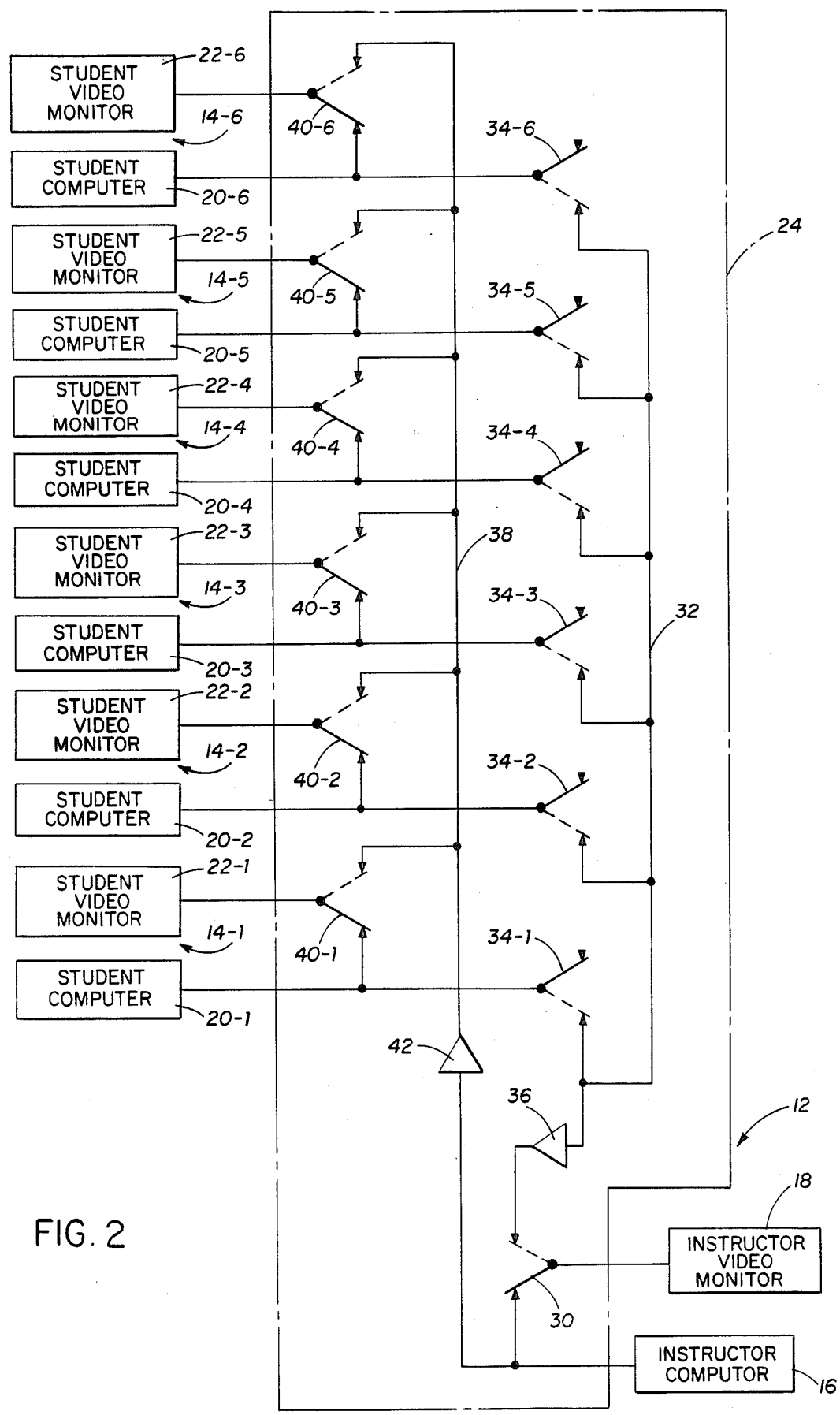
FIG. 2 is a schematic diagram of the computer training system as shown in FIG. 1, further illustrating a video switching system thereof.

Referring to FIG. 2, the circuitry of the video switching system 24 for connecting the student video monitors 22 to the instructor video monitor 18 for observation purposes includes a video switch 30. Video switch 30 is movable between a normal solid line position and a dashed line position as shown in FIG. 2, for connecting the instructor video monitor 18 to the instructor computer 16, and for connecting the instructor video monitor to a receive buss 32 for the transmission of a video signal from a selected one of the student video monitors 22. Video switching system 24 also includes a first series of switches 34, one for each of the student video monitors 22, and designated by the numbers 34-1 through 34-6, for connecting the student computers 20 and the associated student video monitors 22 to the receive buss 32. For this purpose, each of the video switches 34 is movable from a normal solid line position as shown in FIG. 2 to a dashed line position as shown in this figure. A video signal from the connected student video monitor 22 then is transmitted over the receive buss 32 to the instructor video monitor 18 through a buffer amplifier 36 of a known type.

With further reference to FIG. 2, it can be seen that, when video switch 30 is in its solid line position, the switch connects the instructor video monitor 18 to a sent buss 38, as well as to the instructor computer 16, for the transmission of a video signal from the instructor video monitor to one or more of the student video monitors 22. The video switching system 24 further includes a second series of switches 40, one for each of the student video monitors 22, and designated by the numbers 40-1 through 40-6, for disconnecting the student video monitors from their respective computers 20 and connecting the student video monitors to the send buss 38. The video signal from the instructor video monitor 18 then is transmitted to the connected student video monitors 22 through a suitable video signal distribution amplifier 42 of a known type. When more than six of the student video monitors 22 are being utilized, additional distribution amplifiers of the type illustrated by the distribution amplifier 42 may be provided as desired.

With further reference to FIG. 2, by way of example, if the instructor wishes to observe the video monitor 22 at one of the student work stations 14, such as the video monitor 22-6 at the student work station 14-6, the video switch 30 is operated from its solid line position to its dashed line position in FIG. 2 to disconnect the instructor video monitor 18 from the instructor computer 16 and to connect the instructor video monitor to the receive buss 32. At the same time, the video switch 34-6 is operated from its normal solid line position to its dashed line position as shown in FIG. 2 to connect the student computer 20-6 and the associated student video monitor 22-6 to the receive buss 32. Thus, the video display on the student video monitor 22-6 is displayed on the instructor video monitor 18 and the instructor can observe the student's work efforts without disturbing the student and without leaving the instructor work station 12.

Similarly, if the instructor then wishes to provide correction or instructions to the student at the work station 14-6, the video switch 30 is returned to its solid line position to reconnect the instructor video monitor 18 to the instructor computer 16 and to the send buss 38. The video switch 34-6 then also is returned to its solid line position to disconnect the student computer 20-6 and the student video monitor 22-6 from the receive buss 32. At the same time, the video switch 40-6 is moved to its dashed line position as shown in FIG. 2 to disconnect the student video monitor 22-6 from the student computer 20-6 and to connect the student video monitor to the send buss 38. The video display on the instructor video monitor 18 then is displayed on the student video monitor 22-6 for correction or instruction purposes by the instructor, utilizing the instructor computer 16, without the instructor having to leave the work station 16 and without disturbing the student's work at the student computer 20-6.

Similarly, if the instructor wishes to connect the instructor computer 16 and the instructor video monitor 18 to all of the student video monitors 22 for group instruction, the video switch 30 is moved into its normal solid line position as shown in FIG. 2 as above-described. Further, all of the video switches 34-1 through 34-6 are moved into their normal solid line positions as shown in FIG. 2 so that the student computers 20-1 through 20-6 and student video monitors 22-1 through 22-6 are disconnected from the receive buss 32. Finally, all of the video switches 40-1 through 40-6 are moved from their solid line positions to their dashed line positions in FIG. 2 to disconnect the student video monitors 22-1 through 22-6 from the student computers 20-1 through 20 6 and to connect the student video monitors to the send buss 38. In this connection, it is apparent that more than one but less than all of the student video monitors 22 can be connected by the instructor to the send buss 38 in a similar manner as desired.

Referring to FIG. 3, the control panel 28 may include a row of "Receive From Student Station" buttons 44, one for each of the student work stations 14-1 through 14-6 (FIG. 1), the buttons 44 being designated by the numbers 44-1 through 44-6. Further, the control panel 28 may include a second row of "Send to Student Station" buttons 46, one for each of the student work stations 14-1 through 14-6, and designated by the numbers 46-1 through 46-6. In addition, the control panel 28 may include a button 48 for connecting all of the student video monitors 22 to the instructor computer 16 and the instructor video monitor 18 simultaneously for group instruction as above-described.

By way of example, when the instructor wishes to connect the instructor computer 16 and the instructor video monitor 18 to the student computer 20-6 and the student video monitor 22-6 as above described, the instructor depresses the "receive" button 44-6 on the control panel 28. The microprocessor 26 then operates the video switches 30 and 34-6 to connect the instructor video monitor 18, and the student computer 20-6 and student video monitor 22-6, respectively, to the receive buss 32.

When the instructor wishes to connect the instructor computer 16 and the instructor video monitor 18 to the student video monitor 22-6 for correction or instruction purposes as above described, the instructor depresses the "send" button 46-6 and the microprocessor 26 operates the video switches 30 and 34-6 back to their original normal positions, and also operates the video switch 40-6 to connect the student video monitor to the instructor computer and instructor video monitor via the send buss 38. When the instructor wishes to connect additional ones of the student video monitors 22 to the instructor computer 16 and the instructor video monitor 18, in addition to the student video monitor 22-6, the instructor merely depresses the associated buttons 46 for this purpose. Further, when the instructor wishes to connect all of the student video monitors 22-1 through 22-6 to the instructor computer 16 and the instructor video monitor 18 for group instruction, the instructor merely depresses the button 48 on the control panel 28 whereupon the microprocessor 26 operates all of the video switches 40-1 through 40-6 to connect the student video monitors to the instructor computer and the instructor video monitor as above-described. Indicator lamps (not shown can be associated with each of the buttons 44, 46 and 48 on control panel 28 to indicate the state of each of the control buttons.

While one control arrangement for the video switching system 24 has been disclosed, other control arrangements may be used. For example, the microprocessor 26 can be replaced with suitable logic circuitry (not shown) for operating the video switches 30, 34 and 40 in response to the depressing of the buttons 44, 46 and 48 on the control panel 28. In addition, associated ones of the video switches 30, 34 and 40 could be operated simultaneously by being suitably toggled together for operation in response to actuation of the buttons 44, 46 and 48 on the control panel or other button arrangements (not shown). The video switches 30, 34 and 40 also may be mounted adjacent the instructor work station 12 so as to be operable individually by hand if so desired.

In summary, a new and improved computer training system, such as the computer training system 10, has been disclosed. The computer training system 10 includes the instructor work station 12 and the plurality of student work stations 14. The student computer 20 and the associated student video monitor 22 at each of the student work stations 14 can be selectively connected to the video monitor 18 at the instructor work station 12 for viewing of the display on the student video monitor by the instructor without the instructor leaving the instructor work station and without disturbing the student at the connected student work station. Further, the instructor computer 16 and the instructor video monitor 18 can be selectively connected to each of the student video monitors 22 for correction and instruction by the instructor without the instructor leaving the instructor work station and without disturbing the work which has been inputted by the student into the associated student computer 20. Similarly, the instructor computer 16 and the instructor video monitor 18 can be connected to all of the student video monitors 22 simultaneously for group instruction utilizing the instructor computer and the instructor video monitor, and the student video monitors, as an integrated "electronic blackboard" system.

What is claimed is:

1. A computer training system adapted for instruction of a student individually, or a plurality of students simultaneously, particularly in a classroom environment, which comprises:

an instructor work station which includes a computer having an associated video monitor upon which an instructor can produce displays using the instructor work station computer;

at least one student work station which includes a computer having an associated video monitor upon which a student can produce displays using the student work station computer;

first switching means operable by the instructor at the instructor work station for selectively connecting the student work station computer and video monitor to the instructor work station video monitor so that displays being produced on the student work station video monitor by the student are displayed on the instructor work station video monitor to enable the instructor to monitor the work of the student; and second switching means operable by the instructor at the instructor work station for selectively connecting the instructor work station computer and video monitor to the student work station video monitor, and disconnecting the student work station video monitor from the student work station computer while connecting the instructor work station computer and video monitor to the student work station video monitor, so that displays produced by the instructor on the instructor work station video monitor using the instructor work station computer, also are displayed on the student work station video monitor for instruction of the student by the instructor without disturbing work which has been inputted into the student work station computer.

2. A computer training system as recited in claim 1, in which:

the first switching means disconnects the instructor work station video monitor from the instructor work station computer while connecting the student work station computer and video monitor to the instructor work station video monitor.

3. A computer training system as recited in claim 2, which further comprises:

buss means for carrying a video signal from the student work station video monitor to the instructor work station video monitor, the first switching means including a first switch for connecting the student work station video monitor to the signal-carrying buss means, and a second switch movable between a position for connecting the instructor work station video monitor to the instructor work station computer, and a position in which the second switch disconnects the instructors work station video monitor from the instructor work station computer and connects the instructor video monitor to the signal-carrying buss means.

4. A computer training system as recited in claim 1, which further comprises:

buss means for carrying a video signal from the instructor work station video monitor to the student work station video monitor, the second switching means being movable between a position for connecting the student work station video monitor to the student work station computer, and a position in which the second switching means disconnects the student work station video monitor from the student work station computer and connects the student work station video monitor to the video signal-carrying buss means.

5. A computer training system as recited in claim 1, which further comprises:
   a plurality of additional student work stations, each of which includes a computer having an associated video monitor upon which additional students can produce displays independently of one another using the respective student work station computers; and
   additional switching means operable by the instructor at the instructor work station for selectively connecting the computer and video monitor at each of the additional student work stations to the instructor work station video monitor individually such that displays being produced by the student on the connected student work station video monitor are displayed on the instructor work station video monitor to enable the instructor to monitor the work of each student selectively without disturbing the other students.

6. A computer training system as recited in claim 5, wherein;
   the second switching means is operable by the instructor at the instructor work station for selectively connecting the instructor work station computer and video monitor to each of the video monitors at the additional student work stations, and disconnecting each student work station video monitor from the student work station computer while connnecting the instructor work station computer and video monitor to the student work station video monitor, so that displays produced by the instructor on the instructor work station video monitor using the instructor work station computer, also are displayed on each connected student work station video monitor for instruction of each student by the instructor individually, or instruction of a plurality, but not all, of the students simultaneously, without disturbing the other students and work which has been inputted into the student work station computers.

7. A computer training system as recited in claim 6, in which:
   the second switching means connects the instructor work station computer and video monitor to the video monitors at the student work stations simultaneously such that displays produced by the instructor on the instructor work station video monitor are displayed on the student work station video monitors for instruction of all of the students by the instructor simultaneously.

8. A computer training system adapted for instruction of a student individually, or a plurality of students simultaneously, particularly in a classroom environment, which comprises:
   an instructor work station which includes a computer having an associated video monitor upon which an instructor can produce displays using the instructor work station computer;
   at least one student work station which includes a computer having an associated video monitor upon which a student can produce displays using the student work station computer; and
   switching means operable by the instructor at the instructor work station for selectively connecting the instructor work station computer and video monitor to the student work station video monitor, and disconnecting the student work station video monitor from the student work station computer while connecting the instruction work station computer and video monitor to the student work station video monitor, so that displays produced by the instructor on the instructor work station video monitor using the instructor work station computer also are displayed on the student work station video monitor for instruction of the student by the instructor without disturbing work which has been inputted into the student work station computer.

9. A computer training system as recited in claim 8, which further comprises:
   buss means for carrying a video signal from the instructor work station video monitor to the student work station video monitor, the switching means being movable between a position for connecting the student work station video monitor to the student work station computer, and a position in which the switching means disconnects the student work station video monitor from the student work station computer and connects the student work station video monitor to the video signal-carrying buss means.

10. A computer training system as recited in claim 8, which further comprises:
    a plurality of additional student work stations, each of which includes a computer having an associated video monitor upon which additional students can produce displays independently of one another using the respective student work station computers; and
    additional switching means operable by the instructor at the instructor work station for selectively connecting the instructor work station and video monitor to each of the video monitors at the additional student work stations, and disconnecting each connected student work station video monitor from the student work station computer while connecting the instructor work station computer and video monitor to the student work station video monitor, so that displays produced by the instructor on the instructor work station video monitor using the instructor work station computer also are displayed on each connected student work station video monitor for instruction of each student by the instructor individually, or instruction of a plurality, but not all, of the students simultaneously, without disturbing the other students and work which has been inputted into the student work station computers.

11. A computer training system as recited in claim 10, in which:
    the additional switching means connects the instructor work station computer and video monitor to the video monitors at the student work stations simultaneously such that displays produced by the instructor on the instructor work station video monitor are displayed on the student work station video monitors for instruction of all of the students by the instructor simultaneously 12. A computer training system for instruction of a student individually, or a plurality of students simultaneously, in a classroom, which comprises:
    an instructor work station which includes a computer having an associated video monitor upon which an instructor can produce displays using the instructor work station computer;
    a plurality of student work stations each including a computer having an associated video monitor upon which students can produce displays independently of one another using the respective student work station computers;

a receive buss over which video display signals are selectively transmitted from the video monitors at the student work stations to the video monitor at the instructor work station;

a send buss over which a video display signal is selectively transmitted from the video monitor at the instructor work station to the video monitors at the student work stations;

first switching means operable by the instructor at the instructor work station for selectively connecting the video monitors at the student work stations to the send buss independently of one another so that video displays being produced by the student on the connected student work station video monitor are displayed on the instructor work station video monitor to enable the instructor to monitor the work of each student selectively without disturbing the other students, the first switching means including switch means for disconnecting the instructor work station video monitor from the instructor work station computer; and second switching means operable by the instructor at the instructor work station for selectively connecting the instructor work station computer and video monitor to each of the video monitors at the student work stations, and disconnecting each connected student work station video monitor from the student work station computer while connecting the instructor work station computer and video monitor to the student work station video monitor, so that displays produced by the instructor on the instructor work station video monitor using the instructor work station computer, also are displayed on each connected student work station video monitor for instruction of each student by the instructor individually, or instruction of a plurality, but not all, of the students simultaneously, without disturbing the other students and work which has been inputted into the student work station computers.

13. A computer training system as recited in claim 12, in which:

the second switching means connects the instructor work station video monitor to the student work station video monitors simultaneously such that displays produced by the instructor on the instructor work station video monitor are displayed on all of the student work station video monitors simultaneously for instruction of all of the students by the instructor simultaneously.

* * * * *